May 3, 1927.

A. H. SANDERS 1,626,972

MORTAR APPLYING DEVICE

Filed Feb. 25, 1926

Inventor

ALBERT H. SANDERS

By Munn & Co

Attorney

Patented May 3, 1927.

1,626,972

UNITED STATES PATENT OFFICE.

ALBERT H. SANDERS, OF GLENDORA, CALIFORNIA.

MORTAR-APPLYING DEVICE.

Application filed February 25, 1926. Serial No. 90,630.

My invention relates to and has for its purpose the provision of an extremely simple, inexpensive and durable device designed to facilitate the manual application of mortar to the ends of pipes of any character for connecting the meeting ends of pipe sections and particularly of pipes used for irrigation purposes, my invention being applicable to a pipe end to receive a quantity of mortar and operable to quickly and uniformly spread the mortar around the edge of the pipe, so that when connecting the end of a pipe to the end of another pipe a liquid-tight joint between the two will be formed.

I will describe only one form of mortar applying device embodying my invention and will then point out the novel features thereof in claims.

In the accompanying drawings.

Referring specifically to the drawings, my invention, in its present embodiment, comprises an annular body constructed of any suitable rigid material, such as metal or the like, and including an inner member 15 and an outer member 16, the two members being of annular form and arranged concentrically with respect to each other with the outer member rigidly supported in spaced relation to the inner member by a pair of straps 17 of inverted U-shaped form and riveted or otherwise secured at diametrically opposed points to the inner side of the inner member 15 and to the outer side of the outer member 16.

Figure 1:
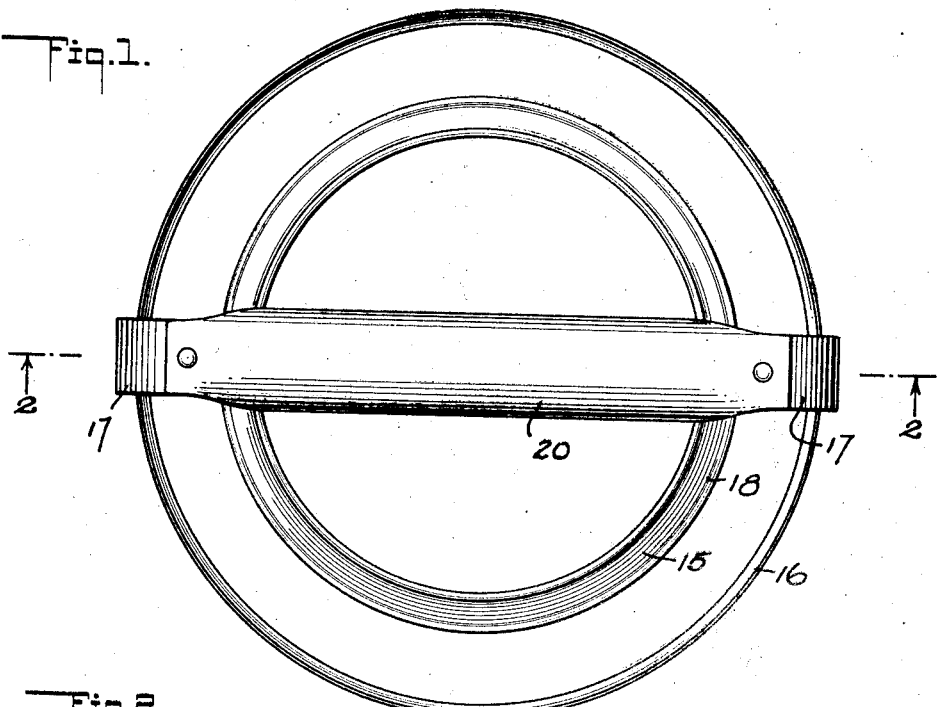
Figure 1 is a view showing in top plan one form of mortar applying device embodying my invention.
Figure 2:
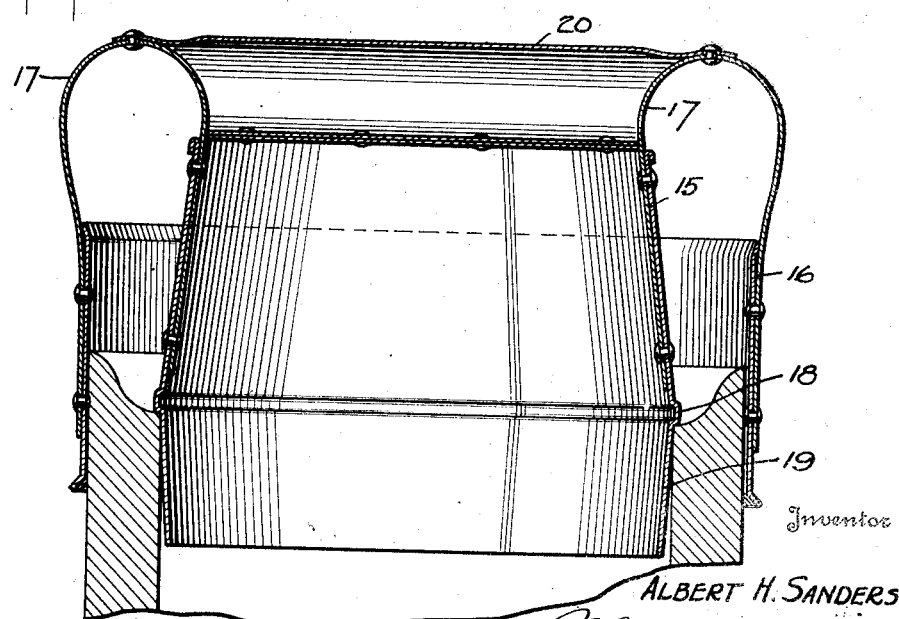
Figure 2 is a vertical sectional view taken on the line 2—2 of Figure 1 and showing the device in applied position to a pipe end.

The inner member 15 is constructed to provide an annular shoulder 18 exteriorly thereof and at a point adjacent the lower end of the member. As shown in Figure 2, that portion of the member 15 below the shoulder 18 is tapered inwardly from its point of connection with the shoulder to provide an annular guiding lip 19. That portion of the member 15 above the shoulder 18 is likewise tapered to form a frusto-conical portion which increases in its spaced relation with respect to the outer member 16, as it proceeds to its upper end. The outer member 16 is constructed to provide a substantially perpendicular inner wall with the upper and lower edges thereof flared outwardly, as shown.

To facilitate handling of the device and to reinforce the straps 17, a tubular handle 20 is riveted or otherwise secured to the upper ends of the straps, this handle being formed of sheet metal and shaped at its opposite ends to receive the curved ends of the straps.

In the operation of the device, it is applied to the upper end of a section of pipe in the manner shown in Figure 2, so that the pipe end is disposed between the members 15 and 16, the tapered portion 19 facilitating application of the device to the pipe end and the annular shoulder 18 limiting the downward movement of the device on the pipe. With the device so applied, the members 15 and 16 co-operate to provide an annular trough into which mortar or any other material used in the connecting of pipe joints of this character is dumped without any regard as to uniformly distributing the mortar about the trough. By now oscillating the entire device on the pipe through twisting of the handle first in one direction and then the other, the frictional contact between the mortar and the confronting sides of the members 15 and 16 will under repeated movement of the latter operate to distribute the mortar uniformly in the trough and, therefore, uniformly on the upper edge of the pipe so that when the device is removed from the pipe a layer of mortar of substantially uniform thickness will be formed around the entire upper edge of the pipe. In laying the pipe sections horizontally, the pipe can be lowered to horizontal position and connected to the meeting end of an adjacent pipe section in the usual manner, the even distribution of the mortar serving to form a fluid-tight joint between the pipe sections.

Manifestly my invention eliminates the tedious process involved in the application of mortar to a pipe end with a trowel, as is now the present practice, and it provides means by which mortar can be quickly applied and uniformly distributed about a pipe edge in a manner to insure a liquid-tight joint.

Although I have herein shown and described only one form of mortar applying device embodying my invention, it is to be understood that various changes and modifications may be made therein without departing from the spirit of the invention and the spirit and scope of the appended claims.

I claim as my invention:

1. A device of the character described comprising means for receiving and confining mortar on the edge of a pipe, and means by which the first means is operable to uniformly spread the mortar around the edge of said pipe.

2. A device of the character described comprising a body adapted for rotation on a pipe end and in circumscribing relation to the edge thereof to receive and confine mortar on said edge, and means by which the body can be oscillated to uniformly spread the mortar along the edge of the pipe.

3. A device of the character described comprising concentric annular members fixed in spaced relation to each other, and a shoulder on the inner member providing a bearing edge adapted to support the device as a whole for rotative movement on a pipe end.

4. A device of the character described comprising a body adapted when associated with a pipe end to form a trough circumscribing the edge of the pipe, and means on the body adapted to engage the pipe in a manner to rotatably support the body on the pipe for the purpose described.

5. A device of the character described comprising annular concentric members fixed in spaced relation to each other, and an annular shoulder on the outer surface of the inner member, the inner member being reversely tapered from the shoulder for the purpose described.

6. A device of the character described comprising an inner annular member having an exterior annular shoulder and tapered reversely from the shoulder, an outer annular member spaced from the inner member, straps secured to both of the members for maintaining the two in spaced relation, and a handle rigidly secured to the straps.

7. A device of the character described comprising coacting members between which mortar is adapted to be received and confined on the edge of a pipe so that by rotating the members the mortar will be uniformly distributed around the edge of the pipe.

ALBERT H. SANDERS.